(12) United States Patent
Fritz

(10) Patent No.: US 7,624,702 B1
(45) Date of Patent: Dec. 1, 2009

(54) AUTOMATIC PET WATERING APPARATUS

(76) Inventor: Paul L. Fritz, 217 W. Turner St., Allentown, PA (US) 18101

( * ) Notice: Subject to any disclaimer, the term of this patent is extended or adjusted under 35 U.S.C. 154(b) by 177 days.

(21) Appl. No.: 12/029,160

(22) Filed: Feb. 11, 2008

(51) Int. Cl.
*A01K 7/00* (2006.01)
(52) U.S. Cl. ........................................... 119/74; 119/77
(58) Field of Classification Search .................... 119/72, 119/74, 51.5, 78–80, 77
See application file for complete search history.

(56) References Cited

U.S. PATENT DOCUMENTS

| | | | | |
|---|---|---|---|---|
| 1,204,156 | A * | 11/1916 | Hubbell | 137/434 |
| 3,196,835 | A * | 7/1965 | Bergevin | 119/51.11 |
| 3,217,694 | A * | 11/1965 | Martin | 119/79 |
| 3,868,926 | A | 3/1975 | Olde | |
| 3,874,341 | A * | 4/1975 | Riba | 119/51.12 |
| 4,131,082 | A * | 12/1978 | Sollars | 119/51.5 |
| 5,433,171 | A | 7/1995 | Ewell | |
| D374,516 | S | 10/1996 | Lillelund et al. | |
| 5,588,394 | A | 12/1996 | Balistreri | |
| 5,845,600 | A | 12/1998 | Mendes | |
| D432,279 | S | 10/2000 | Kim | |
| 6,145,473 | A | 11/2000 | Keisner | |
| 2008/0190374 | A1 * | 8/2008 | Farris | 119/74 |

* cited by examiner

*Primary Examiner*—Rob Swiatek
*Assistant Examiner*—Kristen C Hayes
(74) *Attorney, Agent, or Firm*—Crossley Patent Law; Mark Ashley Crossley

(57) ABSTRACT

The automatic pet watering apparatus provides for very limited human intervention in the operation after installation. No power supply or animal training is needed. The saddle valve provides for supply hose attachment without need of plumbing tools or expertise. Essentially, the only component of the apparatus which may require adjustment or replacement is the inlet valve. The overflow hose provides a safety measure should the valve ever stick, allowing drainage to a chosen area. The semi-ellipsoid shaped bowl housing also has a cavity whereby mass may be added. Flexible supply hose, feed hoses, and overflow hose provide for convenient location of the apparatus components. More than one feed hose can be provided, and more than one bowl housing with bowl can be provided, allowing one reservoir to feed a plurality of bowls, negating added expense when more bowls are needed to either feed more animals or feed one animal in more than one location.

20 Claims, 3 Drawing Sheets

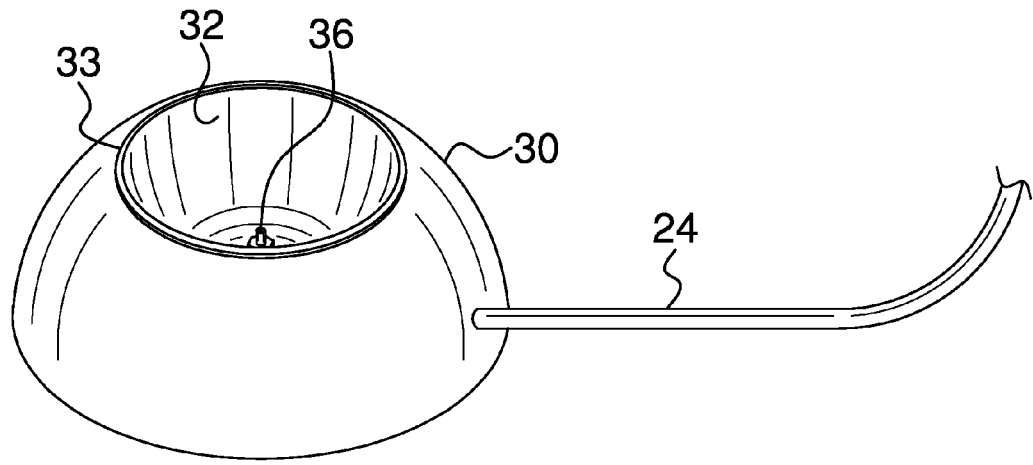
FIG. 1
FIG. 2
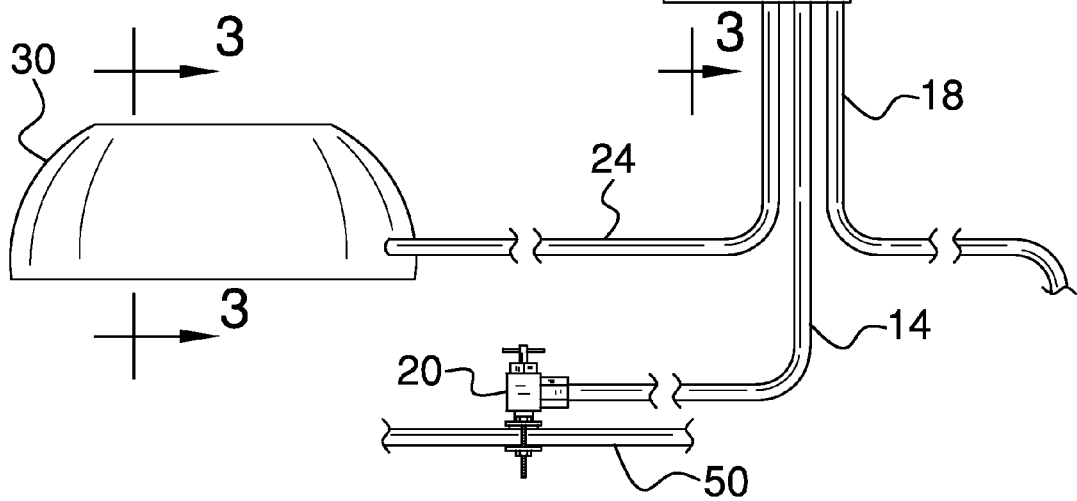

AUTOMATIC PET WATERING APPARATUS

BACKGROUND OF THE INVENTION

Watering pets can often be a continual nuisance, a forgotten task, and also a challenge in absentia. Various devices have been proposed to solve the problem. Most are overly complex and therefore not only expensive but subject to failure. Some devices require refilling of a reservoir. Some devices require electric hookup to power various electrical parts that must operate to execute watering functions. Other devices are combined with feeding devices which is not always a desired feature. Still other devices operate on timers, but watering needs vary with weather and the number of animals being given water, among other considerations. Another concern is the propensity for animals to knock over a water dish. Still another concern is how to automatically water both in and outdoors and in multiple locations. Many owners keep their pets outside until inclement weather such as freezing necessitates indoor habitation. Often separate pet watering devices must be provided for both indoor and outdoor use thus creating additional expense.

What has been needed is a basic automatic watering apparatus that needs little or no attention beyond initial installation. The apparatus should provide for watering in more than one location from the same apparatus. The apparatus should provide for easy bowl removal to allow cleaning. The apparatus should assist in negating spills. The apparatus should not require an animal to progress through any sort of learning curve. The ideal apparatus should provide continual fresh water supply. The present apparatus provides these advantages.

FIELD OF THE INVENTION

The present automatic pet watering apparatus relates to pet watering devices and more especially to an automatic pet watering apparatus that needs very limited attention after initial installation.

SUMMARY OF THE INVENTION

The general purpose of the automatic pet watering apparatus, described subsequently in greater detail, is to provide a automatic pet watering apparatus which has many novel features that result in an improved automatic pet watering apparatus which is not anticipated, rendered obvious, suggested, or even implied by prior art, either alone or in combination thereof.

To attain this, the automatic pet watering apparatus provides for very limited human operation after installation. No power supply is needed. No animal training is needed. The ideal embodiment provides a saddle valve for attachment of the supply hose to existing water line without need of any plumbing tools or expertise. Other embodiments provide hose-end hookups and other means for attaching the apparatus supply hose to an existing water supply. Essentially, the only component of the apparatus which may require adjustment or replacement is the inlet valve which is accessed via lid removal of the reservoir. The overflow hose provides a safety measure should the valve ever stick, allowing drainage to a chosen area and not within an area that might suffer damage from water invasion. The bowl housing is ideally a semi-ellipsoid shape, although other embodiment shapes are provided. Ideally, each bowl housing further comprises a cavity whereby mass may be added to the housing. Although not limited to such, the ideal embodiment of the apparatus comprises flexible supply hose, feed hoses, and overflow hose so that location of components of the apparatus is more conveniently decided. The reservoir of the apparatus is positioned at a height above each bowl and bowl housing used so that the bowls are gravity fed as needed. More than one feed hose can be provided, and more than one bowl housing with bowl can be provided. One reservoir can therefore feed a plurality of bowls, reducing expense when more bowls are needed to either feed more animals or feed one animal in more than one location.

Thus has been broadly outlined the more important features of the improved automatic pet watering apparatus so that the detailed description thereof that follows may be better understood and in order that the present contribution to the art may be better appreciated.

An object of the automatic pet watering apparatus is to be fully automatic.

Another object of the automatic pet watering apparatus is to require no electricity or other power source.

A further object of the automatic pet watering apparatus is to provide a continual supply of fresh water, without need of human attention.

Still another object of the automatic pet watering apparatus is to minimize components and especially moving parts.

An added object of the automatic pet watering apparatus is to provide supply to more than one or more water bowls.

And, an object of the automatic pet watering apparatus is to minimize bowl upset by an animal.

Yet another object of the pet watering apparatus is to provide cost-effective automatic watering of pets.

These together with additional objects, features and advantages of the improved automatic pet watering apparatus will be readily apparent to those of ordinary skill in the art upon reading the following detailed description of presently preferred, but nonetheless illustrative, embodiments of the improved automatic pet watering apparatus when taken in conjunction with the accompanying drawings.

In this respect, before explaining the current embodiments of the improved automatic pet watering apparatus in detail, it is to be understood that the automatic pet watering apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved automatic pet watering apparatus. It is therefore important that the claims be regarded as including such equivalent constructions insofar as they do not depart from the spirit and scope of the automatic pet watering apparatus. It is also to be understood that the phraseology and terminology employed herein are for purposes of description and should not be regarded as limiting.

BRIEF DESCRIPTION OF THE DRAWINGS

FIG. 1 is a perspective view of a bowl and bowl housing of the apparatus.

FIG. 2 is a lateral elevation view.

DETAILED DESCRIPTION OF THE DRAWINGS

With reference now to the drawings, and in particular FIGS. 1 through 5 thereof, the principles and concepts of the automatic pet watering apparatus generally designated by the reference number 10 will be described.

Figure 3:
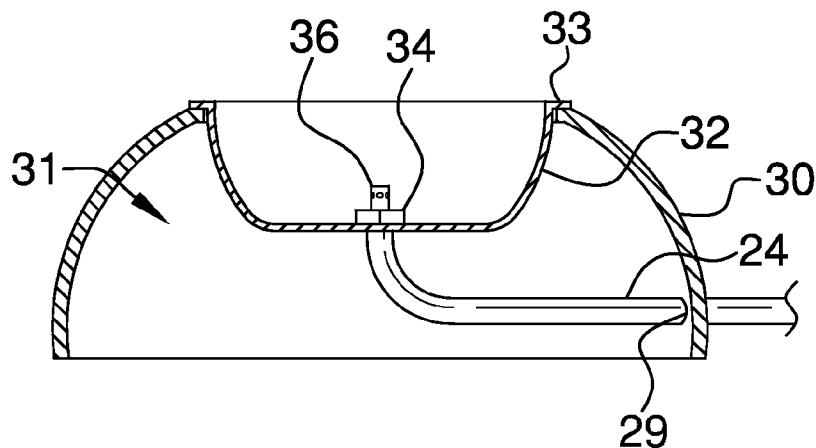
FIG. 3 is a partial cross sectional view of FIG. 1.
Figure 4:
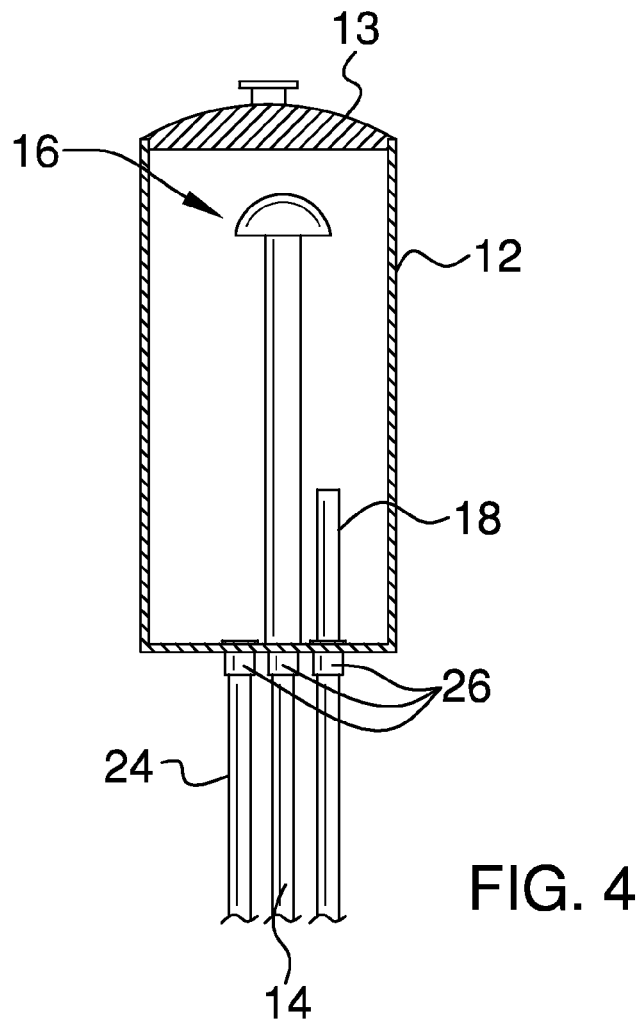
FIG. 4 is a partial cross sectional view of FIG. 1.
Figure 5:
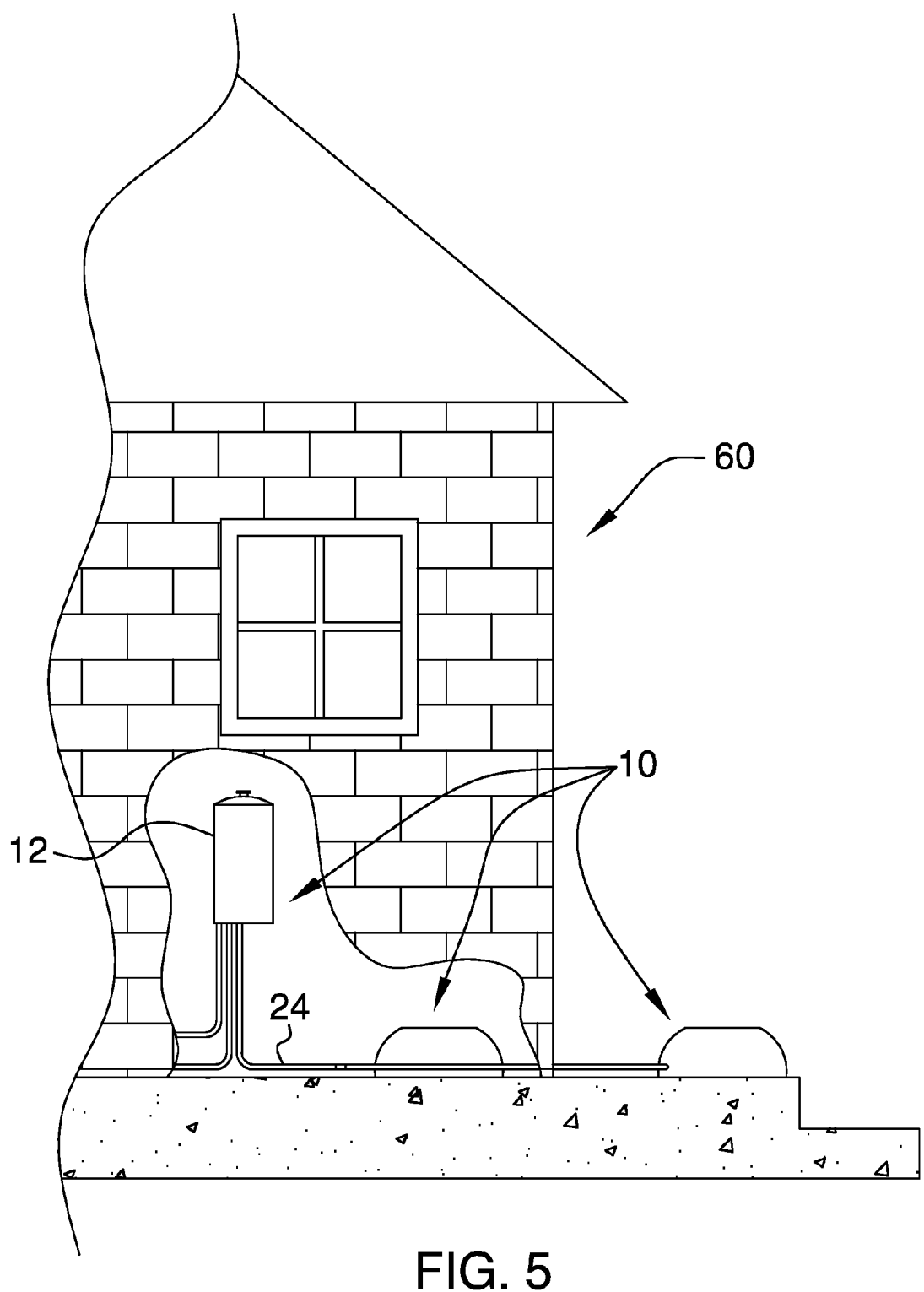
FIG. 5 is a lateral elevation view of the apparatus installed.

Referring to FIG. 5, the automatic pet watering apparatus 10 is installed within and without the house 60. The reservoir 12 is within the house 60. One bowl housing 30 and bowl 32 is disposed within the house 60. One housing 30 and bowl 32 is disposed exterior to the house 60. An extra feed hose 24 can be fitted to the reservoir 12, or, as is illustrated, the feed hose 24 can be Y-ed to connect to more than one bowl 32. More than one additional feed hose 24, bowl housing 30 and bowl 32 can be added in communication with the reservoir 12. The reservoir 12 of the apparatus 10 is capable or feeding numerous feed hoses 24 and bowls 32, thereby providing cost efficiency in automatically watering numerous animals. The reservoir 12 is installed above the level of the bowls 32 so that water from the reservoir 12 gravity feeds. The reservoir 12 installation is, therefore, height sensitive relative to the bowls 32 for proper gravity operation.

Referring to FIGS. 1-4, the apparatus 10 comprises reservoir 12 with a removable lid 13. The lid 13 provides access to the reservoir 12 for installation of supply hose 14, interior reservoir 12 cleaning, installation of feed hoses 24, installation of and height adjustment of overflow hose 18, and inlet valve 16 installation, adjustment, and replacement if needed. The supply hose 14 first end is sealably fitted to the bottom of the reservoir 12 via the grommet 26.

The saddle valve 20 is fitted to the second end of the supply hose 14. The saddle valve 20 is affixed to the existing water line 50 by basic clamping. No plumbing tools or expertise is required, insuring that virtually any pet caregiver can install the apparatus 10. The adjustable water inlet valve 16 is disposed within the reservoir 12. The inlet valve 16 is affixed to the first end of the supply hose 14. The inlet valve 16 is both replaceable and adjustable for water height within the reservoir 12. The inlet valve 16 cuts off flow of supply hose 14 water into the reservoir 12 when the adjusted water level is reached. The first end of the overflow hose 18 is sealably disposed within the reservoir 12 via the grommet 26. The feed first end of the feed hose 24 has is sealably fitted to the bottom of the reservoir 12 via the grommet 26. The second end of the feed hose 24 comprises a bowl inlet port 36 for water exit from the feed hose 24 into the bowl 32. Although the feed hose 24 is not relegated to such, the ideal embodiment comprises a ⅜-inch diameter. This diameter provides for flexibility while retaining good flow characteristics and resistance to crimping. The semi-ellipsoid bowl housing 30 has an upper central cutout, a flat bottom, and a side orifice 29. The side orifice 29 removably receives the feed hose 24. The cavity 31 of the bowl housing 30 is capable of addition of mass should the same be needed to avoid an animal upsetting the bowl housing 30 and consequently the bowl 32. Many animals paw at and nudge a water container. The semi-ellipsoid shape of the bowl housing 30 provides little to no grip for paws or noses to nudge the housing 30. And, the potential addition of mass further ensures against the bowl 32 and flat bottom housing 30 tipping. The bowl 32 is removably fitted within the bowl housing 30.

The lip 33 of the bowl 32 rests atop the bowl housing 30 around the perimeter of the cutout. The keeper 34 is removably affixed to the second end of the feed hose 24 thereby selectively retaining the feed hose within the bowl 32.

With respect to the above description then, it is to be realized that the optimum dimensional relationships for the parts of the automatic pet watering apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the automatic pet watering apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the automatic pet watering apparatus may be used.

Therefore, the foregoing is considered as illustrative only of the principles of the automatic pet watering apparatus. Further, since numerous modifications and changes will readily occur to those skilled in the art, it is not desired to limit the automatic pet watering apparatus to the exact construction and operation shown and described, and accordingly, all suitable modifications and equivalents may be resorted to, falling within the scope of the automatic pet watering apparatus.

What is claimed is:

1. An automatic pet watering apparatus, comprising:
 a lidded reservoir;
 a supply hose, a first end of the supply hose sealably fitted to a bottom of the reservoir;
 means for communication between the supply hose and an existing water supply;
 an adjustable water inlet valve disposed within the reservoir, the inlet valve affixed to the first end of the supply hose;
 an overflow hose, a first end of the overflow hose sealably disposed through the reservoir, the first end of the overflow hose at a height below the lid of the reservoir;
 a feed hose having a first end and a second end, the first end of the feed hose sealably fitted to a bottom of the reservoir, the second end comprising a bowl inlet port;
 a bowl housing having an upper central cutout and a side orifice, the orifice in removable receipt of the feed hose;
 a bowl removably fitted within the cutout of the bowl housing, a lip of the bowl rested atop the bowl housing;
 a keeper removably affixed to the second end of the feed hose whereby the feed hose is selectively retained within the bowl.

2. The apparatus according to claim 1 wherein the feed hose further comprises a ⅜ inch diameter.

3. The apparatus according to claim 2 wherein the feed hose further comprises flexibility.

4. The apparatus according to claim 3 wherein the means for communication between the supply hose and the existing water supply further comprises a saddle valve fitted to a second end of the supply hose.

5. The apparatus according to claim 2 wherein the means for communication between the supply hose and the existing water supply further comprises a saddle valve fitted to a second end of the supply hose.

6. The apparatus according to claim 1 wherein the means for communication between the supply hose and the existing water supply further comprises a saddle valve fitted to a second end of the supply hose.

7. An automatic pet watering apparatus, comprising:
 a lidded reservoir;
 a supply hose, a first end of the supply hose sealably fitted to a bottom of the reservoir;
 means for communication between the supply hose and an existing water supply;
 an adjustable water inlet valve disposed within the reservoir, the inlet valve affixed to the first end of the supply hose;

an overflow hose, a first end of the overflow hose sealably disposed through the reservoir, the first end of the overflow hose at a height below the lid of the reservoir;

a feed hose having a first end and a second end, the first end of the feed hose sealably fitted to a bottom of the reservoir, the second end comprising a bowl inlet port;

a semi-ellipsoid bowl housing having an upper central cutout, a flat bottom, and a side orifice, the orifice in removable receipt of the feed hose;

a bowl removably fitted within the cutout of the bowl housing, a lip of the bowl rested atop the bowl housing;

a keeper removably affixed to the second end of the feed hose whereby the feed hose is selectively retained within the bowl.

8. The apparatus according to claim 7 wherein the bowl housing further comprises the cavity capable of an addition of mass.

9. The apparatus according to claim 8 wherein the feed hose further comprises a flexible ⅜ inch diameter.

10. The apparatus according to claim 9 wherein the means for communication between the supply hose and an existing water supply further comprises a saddle valve fitted to a second end of the supply hose.

11. The apparatus according to claim 10 wherein the supply hose further comprises flexibility; and
the overflow hose further comprises flexibility.

12. The apparatus according to claim 9 wherein the supply hose further comprises flexibility; and
the overflow hose further comprises flexibility.

13. The apparatus according to claim 8 wherein the means for communication between the supply hose and an existing water supply further comprises a saddle valve fitted to a second end of the supply hose.

14. The apparatus according to claim 13 wherein the supply hose further comprises flexibility; and
the overflow hose further comprises flexibility.

15. The apparatus according to claim 8 wherein the supply hose further comprises flexibility; and
the overflow hose further comprises flexibility.

16. The apparatus according to claim 7 wherein the feed hose further comprises a flexible ⅜ inch diameter.

17. The apparatus according to claim 16 wherein the means for communication between the supply hose and an existing water supply further comprises a saddle valve fitted to a second end of the supply hose.

18. The apparatus according to claim 17 wherein the supply hose further comprises flexibility; and
the overflow hose further comprises flexibility.

19. The apparatus according to claim 16 wherein the supply hose further comprises flexibility; and
the overflow hose further comprises flexibility.

20. An automatic pet watering apparatus, comprising:

a lidded reservoir;

a flexible supply hose, a first end of the supply hose sealably fitted to a bottom of the reservoir;

a saddle valve fitted to a second end of the supply hose, the saddle valve selectively affixed to an existing water line;

an adjustable water inlet valve disposed within the reservoir, the inlet valve affixed to the first end of the supply hose;

a flexible overflow hose, a first end of the overflow hose sealably disposed through the bottom of the reservoir, the first end of the overflow hose at a height below the lid of the reservoir;

at least one flexible feed hose having a first end and a second end, the first end of each feed hose sealably fitted to the bottom of the reservoir, the second end comprising a bowl inlet port;

at least one semi-ellipsoid bowl housing having an upper central cutout, a flat bottom, and a side orifice, said side orifice in removable receipt of one feed hose, a cavity of the bowl housing capable of an addition of mass;

a bowl removably fitted within the cutout of the bowl housing, a lip of the bowl rested atop the bowl housing;

a keeper removably affixed to the second end of feed hose whereby the feed hose is selectively retained within one bowl.

\* \* \* \* \*